United States Patent [19]

Bailey

[11] Patent Number: 4,494,051
[45] Date of Patent: Jan. 15, 1985

[54] MULTI-QUADRANT BRUSHLESS DC MOTOR DRIVE

[75] Inventor: David A. Bailey, Torrance, Calif.

[73] Assignee: The Garrett Corporation, Los Angeles, Calif.

[21] Appl. No.: 354,963

[22] Filed: Mar. 5, 1982

[51] Int. Cl.³ .............................................. H02K 29/02
[52] U.S. Cl. .................................... 318/254; 318/138; 318/439
[58] Field of Search ........................ 318/254, 138, 439

[56] References Cited

U.S. PATENT DOCUMENTS

| | | |
|---|---|---|
| 3,217,223 | 11/1965 | Chubb, Jr. . |
| 3,378,746 | 4/1968 | Weiser . |
| 3,569,809 | 3/1971 | Comer . |
| 3,648,031 | 3/1972 | Neal . |
| 3,683,254 | 8/1972 | Masse et al. . |
| 3,777,122 | 12/1973 | Borsboom . |
| 3,961,279 | 10/1975 | Kawano et al. . |
| 4,019,107 | 4/1977 | Dixon et al. . |
| 4,027,215 | 5/1977 | Knight et al. . |
| 4,041,361 | 8/1977 | Cornell . |
| 4,042,868 | 8/1977 | Rhodes . |
| 4,074,175 | 2/1978 | Born et al. . |
| 4,107,593 | 8/1978 | Anderson ............................ 318/138 |
| 4,156,169 | 5/1979 | Imamura . |
| 4,167,693 | 9/1979 | Liska et al. . |
| 4,270,074 | 5/1981 | Duckworth ........................ 318/138 |
| 4,329,636 | 5/1982 | Uchida et al. ...................... 318/254 |
| 4,358,720 | 11/1982 | Abe ................................... 318/254 |
| 4,358,724 | 11/1982 | Haner ................................. 318/681 |
| 4,392,094 | 7/1983 | Kuhnlein ............................ 318/254 |
| 4,393,339 | 7/1983 | Kimura .............................. 318/254 |

FOREIGN PATENT DOCUMENTS 4749641 9/1967 Japan .

*Primary Examiner*—B. Dobeck
*Attorney, Agent, or Firm*—Henry M. Bissell; Leslie S. Miller; Albert J. Miller

[57] ABSTRACT

A control circuit for a brushless DC motor providing positive control in all four quadrants of motor operation. The circuit provides control of motor current, thereby controlling motor torque, in response to an applied current command signal, relying solely on feedback signals of motor current and rotor angle. The heart of the system is a level dependent logic stage which selectively controls the states of the switches applying power to the motor windings in accordance with a current error signal developed by reference to the feedback current signal. The control circuit causes the motor current to correspond to any applied current command and works at any motor speed and torque for rotation in either direction.

In a preferred embodiment, the basic control system is combined with additional feedback loops developing servo information regarding rate and actuator position to provide a overall position control system, such as is particularly useful in place of the hydraulic actuator systems now employed in aircraft.

37 Claims, 9 Drawing Figures

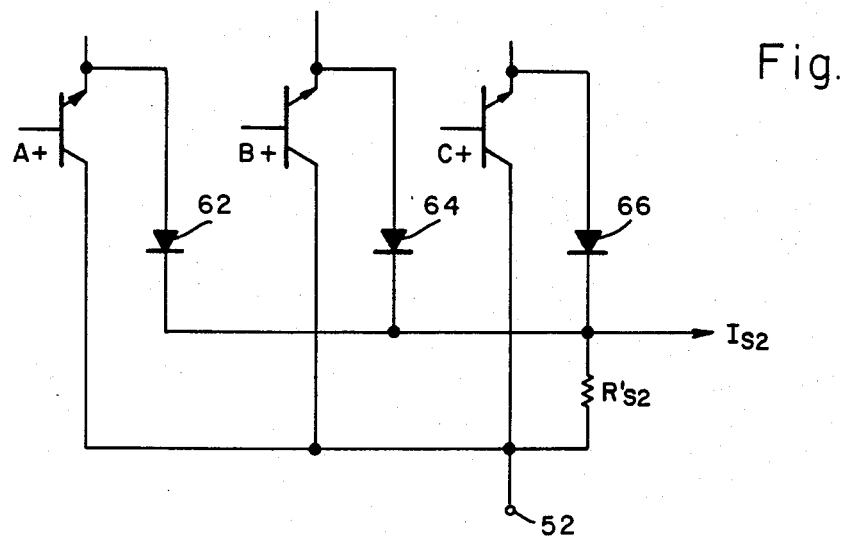
Fig. 8.
Fig. 7.
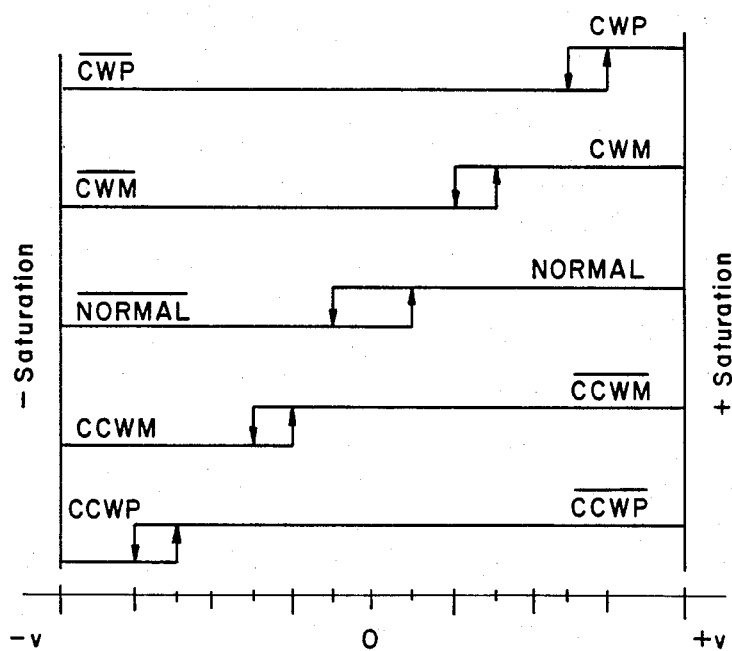

MULTI-QUADRANT BRUSHLESS DC MOTOR DRIVE

The Government has rights in this invention pursuant to Contract No. F33615-80-C-3620 awarded by the U.S. Air Force.

BACKGROUND OF THE INVENTION

1. Field of the Invention

The present invention is related generally to electromechanical actuation systems and, more particularly, to a multi-quadrant brushless motor drive system for controlling the magnitude and direction of the torque output of a DC motor.

2. Description of the Prior Art

Numerous applications require an actuation system for positioning a specified load as a function of a position command signal. Actuation systems used to control aircraft flight are of particular importance in the design of safe, energy-efficient aircraft. The design of an electromechanical actuation system or an aircraft flight control system is complicated by the necessity of satisfying numerous, and often conflicting, requirements such as steady-state and dynamic performance, duty cycle, weight, envelope, installation, reliability and cost.

A variety of motor control systems are known, none of which completely satisfies the needs met by arrangements in accordance with the present invention. For example, the Masse et al U.S. Pat. No. 3,683,254 discloses a servo system which contains provision for protecting against instabilities and system performance due to system noise. The system provides for automatic noise cancellation and acts, through velocity control in the servo system driving circuitry, to limit the drive whenever the system is subjected to noise. However, the disclosed servo system is directed to the control of a stepping motor, and therefore is not pertinent to the present system for controlling a brushless DC motor.

The Dixon et al U.S. Pat. No. 4,019,107 discloses an arrangement for controlling a shunt DC motor, rather than the permanent magnet DC motor to which the present system is directed. Moreover, this system utilizes a tachometer readout to develop a motor speed signal which is required in the control system.

Imamura U.S. Pat. No. 4,156,169 discloses a system designed to control the velocity of a motor by comparing a velocity signal with a velocity command signal to vary the motor drive. This differs from the present system which is capable of developing control without resort to motor shaft velocity.

The Liska et al U.S. Pat. No. 4,167,693 discloses a commutation circuit for controlling a brushless DC motor. However, the control circuitry of this patent is principally directed to reducing the sensitivity of the drive circuits to self-induced current spikes.

Smooth motor operation is essential in providing the degree of safety and control required in aircraft actuator systems. Such prior art DC motor systems as are known fail to provide sufficiently smooth motor operation for electromechanical actuators used in aircraft flight control systems. A typical prior art DC motor drive system controls the operation of the motor only in the first quadrant, where both the voltage and current are positive, and in the third quadrant where both the current and voltage are negative. A DC motor drive system which provides driven operation of a motor only in the first and third quadrants ignores the transients which some switching actions develop in the second and fourth quadrants. The failure of prior art systems to provide smooth motor operation during voltage and current transients throughout the operating cycle results from discontinuities in the logic which controls the switching actions. The difficulties associated with the prior art motor drive circuits are particularly acute in electromechanical actuators such as may be used in aircraft flight control systems because the motors in such systems are often operated at low speed where the effects of logic discontinuities have the greatest effect.

There are prior art DC motor drive systems which provide four-quadrant operation; however such systems generally require an input signal indicative of the direction of rotation of the rotor. Known prior art four-quadrant motor drive systems are complex and fail to provide the smoothness of motor operation required for aircraft flight control systems.

A particular DC motor control system is needed which can provide smooth, precisely controllable motor operation for aircraft flight control systems which are suitable for replacing hydraulic actuation systems presently in use.

SUMMARY OF THE INVENTION

In brief, arrangements in accordance with the present invention comprise control circuitry for driving a brushless DC motor. This control circuitry controls the application of power to the field windings of the motor and is effective in all four quadrants of motor operation; that is, when the motor current and voltage are both of the same polarity (quadrants I and III) and when the motor current voltage are of opposite polarity with respect to each other (quadrants II and IV).

In one particular arrangement of a basic control circuit in accordance with the invention, a current command signal, derived as an error signal from a comparison of signals representing shaft position and desired position, is compared with a feedback signal corresponding to current in the switching circuit. The difference between the current command signal and the feedback signal is integrated and processed in a dynamic compensation network of a mathematical form comprising an integration and a zero and a pole. The zero and the pole form a lead-lag network which controls the modulation frequency of the switching control loop. The thus-processed current error signal is applied to a level dependent logic stage which comprises a plurality of drive switches, each designed to change state between saturated on and saturated off conditions at different levels of the control current. The outputs of these switches are applied to a commutation logic stage where, in combination with signals indicating motor rotor position, the determination is made as to which of the power switches are to be turned on or off to control the application of power to the respective motor windings.

Each of the power switches has connected in parallel with it a reversely poled diode to provide a path for motor current when the associated transistor switch is turned off. Those switching transistors coupled to one side of the power supply are tied in parallel to a common series resistor which serves as a first sensing resistor for feedback current. The associated diodes are tied in common to a second series resistor which serves as a second sensing resistor for feedback current. The feedback current signal is developed from a comparison of the transistor current and diode current, and the absolute value of the higher of the two sensing current signals is used for the feedback current.

As the error current signal sweeps across the control range of the level dependent switches, the switches respond to select the motor windings which are to be energized, relative to instantaneous rotor position. Quasi-steady state conditions may develop in the level dependent logic in which motor current approaches the level of the command current in a given mode. However, typically, motor current overshoots the current command level. This is sensed through the feedback current, which results in a change in the error current so that the motor current again approaches the command level, but from the other side with subsequent overshoot back and forth about the command level. This occurs as the error current input to the level dependent logic dithers back and forthe about the switching point of one or another of the level dependent logic switches. This dithering occurs at a rapid rate, compared with the electromechanical response characteristics of the motor circuitry and components—typically in the range of 10 kilohertz—with a corresponding high repetition rate for the application of pulses of power to the motor windings. Operation of the level dependent logic switches in the manner described permits pulse width modulation control of motor current. The parameters of the networks in the control loop dynamic compensation network are dependent upon the characteristics of the motor to be driven and on the desired ripple frequency. A principal function of this loop is to allow a high frequency oscillation in the error current at a low amplitude. This oscillation allows the motor to be driven under pulse width modulation control. Variation of the duty cycle in the pulse width modulation control scheme is effected by selecting the extent of the hysteresis in the level dependent logic switches (that is, the extent of the potential difference between the switch-on voltage and the switch-off voltage) and selecting the gain of the dynamic compensation network which processes the error current for application to the level dependent logic circuit.

Another dynamic compensation network is provided ahead of the point at which the current command and the feedback current signal are compared. The two dynamic compensation networks serve to prevent erroneous switchings in the control circuitry due to command signal noise. This additional dynamic compensation network operates as single pole filter to reject sharp transients, such as noise, in the command signal. The input of this dynamic compensation network also includes a current limiting circuit which arbitrarily limits the command signal to a level compatible with maximum permissible current levels in the motor windings.

The level dependent logic allows the appropriate transistor switches to be turned on without having to know which transistors are are required because of variations in operating modes. This operation is possible by virtue of the feedback current which is switched in polarity after derivation of the absolute value of the highest sensed current, depending upon whether or not the motor is to be driven in the counterclockwise direction. Thus, in this current loop as described, it is not necessary that a tachometer signal be provided to indicate motor speed or direction.

In one particular application of the motor control system of the invention described above, a tachometer loop and actuator position sensor loop are added, together with appropriate comparison circuitry, to develop the current command signal. In that control circuit, a position command, indicative of the desired position of an actuator driven by the motor, is compared with a feedback signal indicating true actuator position. The difference is applied as an error signal to a further comparision stage for combination with a rate feedback signal from a tachometer coupled to the motor. A tachometer signal is useful in determining the level of current for the current command signal. Rate feedback in this manner allows the use of higher loop gains for improved performance of the overall control circuit, and helps to mitigate instability due to non-linearities and large inertial loads.

BRIEF DESCRIPTION OF THE DRAWING

A better understanding of the present invention may be had from a consideration of the following detailed description, taken in conjunction with the accompanying drawing in which:

FIG. 7 is a graphic representation, similar to FIG. 1, showing the conditions of various switching stages in the level dependent logic as a function of control voltage; and FIG. 8 is a partial diagram of the circuit of FIG. 5, illustrating a modification thereof.

DESCRIPTION OF THE PREFERRED EMBODIMENT

Figure 1:
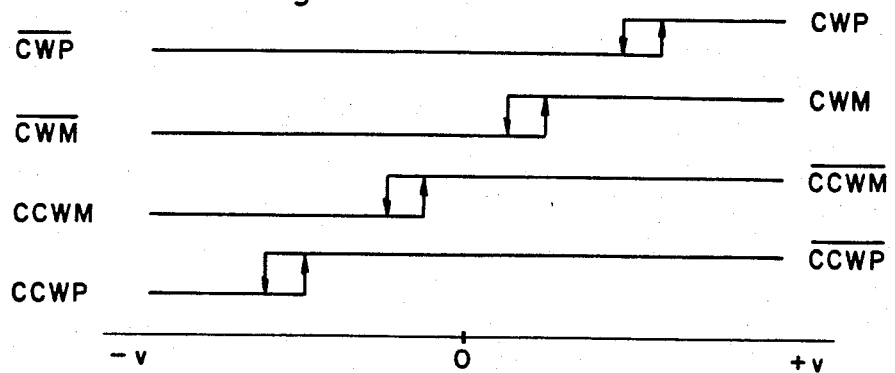
FIG. 1 is a graph illustrating the switching parameters of motor control switches employed in arrangements embodying the invention.
Figure 2:
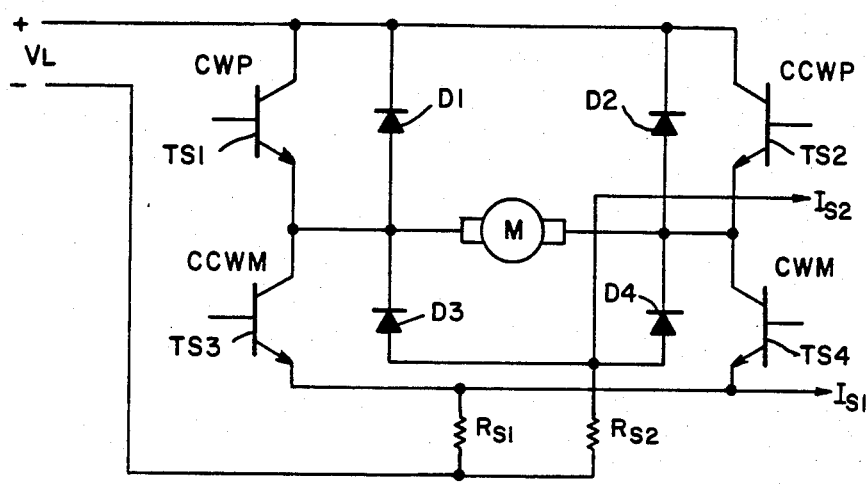
FIG. 2 is a circuit diagram provided for purposes of illustration in explaining the operation of the invention, in conjunction with FIG. 1.

It might be helpful to an understanding of the concept of the present invention to briefly discuss a simplified control circuit for an electric motor. FIG. 1 is a graphical representation, without scale designation, of the four power control switches TS1–TS4 in FIG. 2. These switches are shown in FIG. 2 as connecting a motor between plus and minus line voltage. Each of the switches is connected in parallel with a diode (D1 to D4) poled for conducting current in the opposite direction to its associated switch. The switches have been given designations indicative of their position in the circuit and their driving effect on the motor M. Thus, switch TS1 is designated CWP (for "clockwise positive"). Switch TS2 is designated CCWP (counterclockwise positive), TS3 is designated CCWM (counterclockwise minus) and switch TS4 is designated CWM (clockwise minus).

The graphical representation of FIG. 1 indicates the states of their respective switches TS1–TS4 as a function of an applied bias voltage (corresponding to a variable control level). As the voltage applied to the respective control terminals of the respective switches is varied between a value of −V, at which all switches are in the condition indicated at the left side of the figure, to +V, at which all switches are in the condition indicated at the right-hand side of the figure, the switches change state along paths indicated by the arrows. In changing state between saturated off and saturated on conditions, each of the switches changes state from off to on at a slightly different bias potential from that at which it changed state from on to off, thus exhibiting the hysteresis loops shown in FIG. 1. The arrows indicate the direction of the change of state versus control voltage. Moreover, the switching circuits are designed so that each switch exhibits its changes of state at a different level of control voltage.

There are three cases to consider in discussing the operation of the simplified control circuit of FIG. 2: motor current negative, motor current zero, and motor current positive.

CASE 1: Negative Motor Current

With the control voltage at −V (see FIG. 1) both counterclockwise switches TS2 and TS3 are on, while the clockwise switches TS1 and TS4 are off. This results in a motor voltage of −VL across the motor M. As the control voltage becomes more positive, switch TS2 turns off first, resulting in zero voltage being applied to the motor. The back EMF of the motor now drives current through the conducting switch TS3, then through the transistor current sense resistor RS1 and back through the diode current sense resistor RS2 and diode D4. It will be noted that when a shunting diode conducts as the result of turning off one of the control switches, current in the diode sensing resistor is opposite in direction, relative to line potential, to current in the transistor sensing resistor. The resulting current sensing levels are picked off from the circuit of FIG. 2 as feedback currents IS1 and IS2, for transistor current sensing and diode current sensing, respectively. As the control voltage is increased further, the switch TS3 turns off and the energy stored in the inductance of the motor drives current to and from the line through diodes D1 and D4, respectively. The voltage applied across the motor is +VL.

CASE 2: ZERO MOTOR CURRENT

Again starting with the most negative input (−V of FIG. 1) to the level dependent logic, this condition results in −VL being applied to the motor, as before. As the control voltage is increased, switch TS2 turns off and the application of line voltage VL is removed, so that the voltage across the motor becomes equal to its back EMF. This is the voltage seen across the motor until the applied control voltage reaches the highest level, at which switch TS1 is turned on. At this point voltage +VL is applied across the motor.

CASE 3: POSITIVE MOTOR CURRENT

Starting again with the most negative applied control voltage, −VL is applied to the motor as before, although the direction of motor current is opposite to that of Case 1, corresponding to a deceleration of clockwise rotation. As the level of control voltages increases, the voltage across the motor remains −VL until the switch TS4 is turned on, resulting in zero volts being applied across the motor. Thereafter, when the switch TS1 turns on, the voltage becomes +VL across the motor.

The following table may be constructed to illustrate the different levels of motor voltage for the different switch conditions.

TABLE I

|  | −V |  |  |  | +V |  |
|---|---|---|---|---|---|---|
| CWP | off | off | off | off | on | ⎫ |
| CWM | off | off | off | on | on |  |
| CCWM | on | on | off | off | off | ⎬ Switch condition |
| CCWP | on | off | off | off | off | ⎭ |
| I < 0 | −VL | 0 | +VL | +VL | +VL | ⎫ |
| I = 0 | −VL | VBEMF | VBEMF | VBEMF | +VL | ⎬ Motor Voltage |
| I > 0 | −VL | −VL | −VL | 0 | +VL | ⎭ |

Upon examination of Table I, it can be seen that in every case as the input level increases to the control switches (level dependent logic) the motor voltage increases. The motor current affects where the changes to the motor voltage take place. Since the difference between the desired or commanded motor current and the actual motor current is integrated, the time average of the actual motor current will equal the commanded motor current. The output of the integration (the control error signal) will always be moving in the direction to bring the actual motor voltage toward the desired motor voltage (and current). Since the motor voltage switches from one discrete level to another, it is always too low or too high and the feedback current changes accordingly, thus causing the error signal applied as control to the level dependent switches to oscillate correspondingly.

Figure 3:
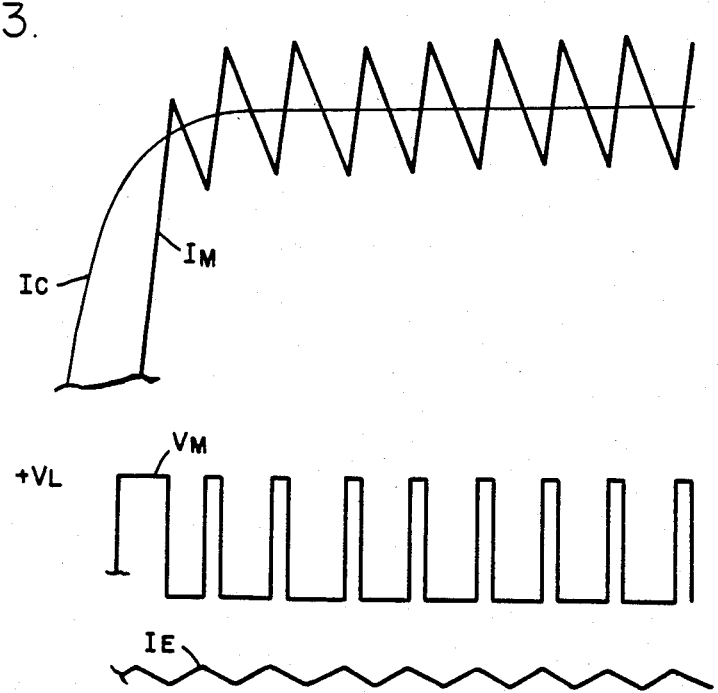
FIG. 3 is a graph showing particular waveforms developed in the operation of a motor control circuit of the present invention.

FIG. 3 illustrates waveforms showing motor operation for a brief interval during a specific control mode. The command current Ic is shown rising to a steady state level. The motor current Im follows and overshoots, then oscillates back and forth about the command current level. The error current Ie which is applied to the control switches for the example of FIG. 1 dithers back and forth across the biasing level at which a particular one of the switches changes state. The voltage to the motor (Vm) shifts correspondingly between +VL and zero. Thus, when the motor voltage Vm is first switched off, the slope of the motor current Im changes sign and motor current decreases. This causes the feedback current to change, thus causing the error signal Ie to move positively until a particular switch affecting control turns on. Motor current then increases until the switch is turned off and the cycle repeats. The time span for the segments of waveform illustrated in FIG. 3 is approximately one millisecond. Thus it can be seen that the oscillation frequency is about 10 kilohertz.

Figure 4:
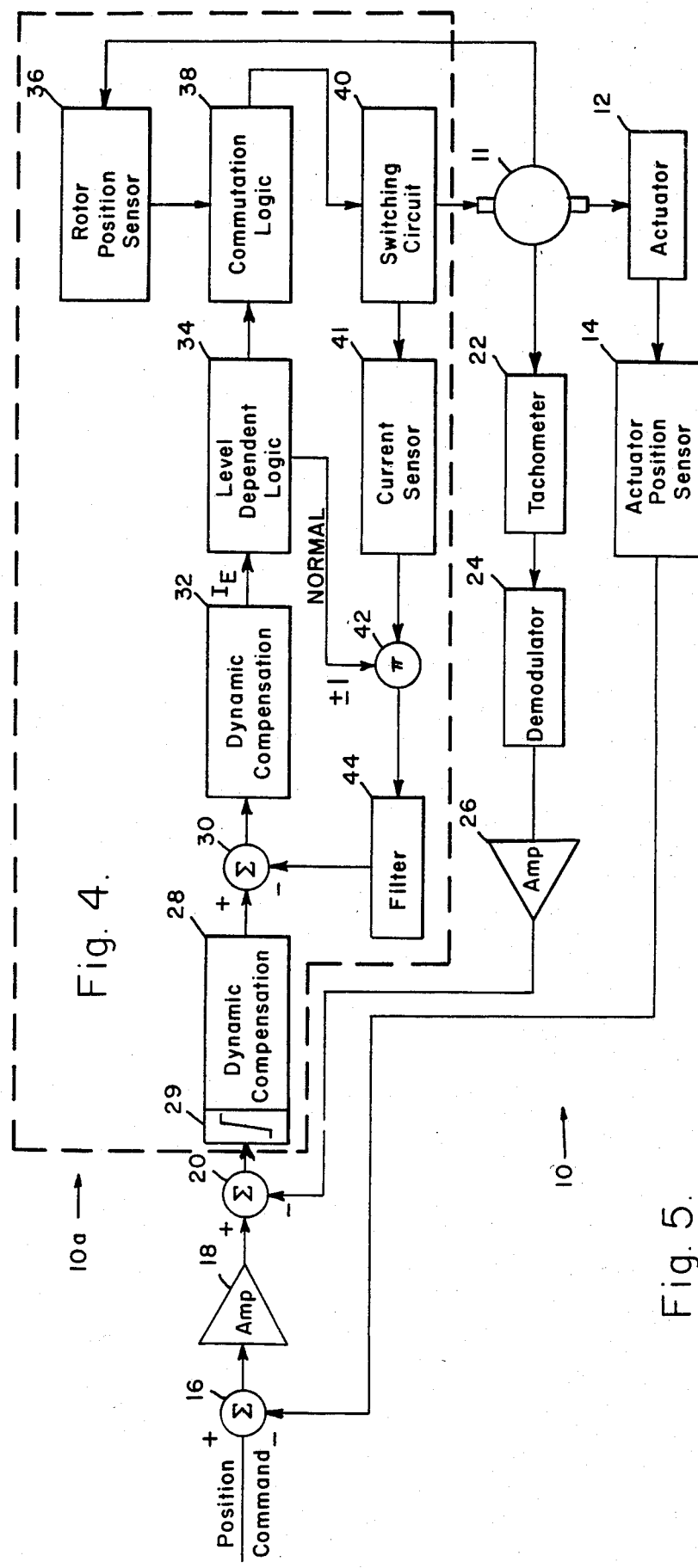
FIG. 4 is a block diagram of a control circuit in accordance with the invention.

The block diagram of FIG. 4 shows a control circuit 10 for a motor 11 coupled to drive an actuator 12, which may, for example, be a member coupled to control the position of a control surface of an aircraft, the position of which is to be set in response to an applied position command signal.

A position sensor 14 is coupled to the actuator 12 to develop a position signal which is applied to a summing stage 16 for comparison with the applied position command signal. The difference between the two signals is amplified in amplifier 18 and applied to comparison stage 20 for comparison with a rate feedback signal from a rate feedback loop including a tachometer 22 coupled to the motor 11 and providing a rate signal through a demodulator 24 and amplifier 26. The thus-modified position error signal is applied to a dynamic compensation stage 28 which has at its input a current limiting circuit 29. This current limiting circuit 29 may comprise an operational amplifier having a pair of Zener diodes for limiting the command signal between predetermined limits which correspond to the particular maximum currents to be permitted in the motor 11.

The portion of the circuit of FIG. 4 shown within the broken line 10A represents the basic control circuitry of my preferred embodiment, and it will be demonstrated hereinafter that this control circuit can be used to control a motor without the need for a rate feedback signal, as developed from the tachometer 22 and applied to the comparator 20 to modify or condition the applied position error signal. Thus, any suitable current command signal can be applied as input to the current limiter 29 and first dynamic compensation stage 28 to drive the basic control circuit 10A. In the preferred embodiment, the dynamic compensation stage 28 includes a single pole filter providing a roll-off at 15,000 radians per second. This has the LaPlace transform function $1/(S/15,000+1)$. The resulting filtered current command signal from the dynamic compensation stage 28 is applied to a comparison stage 30 which also receives as its input a feedback current signal from a feedback loop which includes a current sensor 41 coupled to a power switching circuit 40 which drives the motor 11. As will be explained further, this current sensor 41 provides a signal equal to the absolute value of the larger of two currents which are sensed in the switching circuit 40. This absolute value signal is then multiplied in the stage 42 by a signal (designated NORMAL) from the level dependent logic stage 34 which has a value of either plus or minus 1. The output stage 42 will then be either positive or negative, depending on the state of the NORMAL signal from the stage 34. This feedback signal is then fed through a filter 44, preferably having a roll-off at approximately 314,000 radians per second, having the LaPlace transform $1/(S/314,000+1)$. The result of the comparison in stage 30 of the command current and the filtered feedback current becomes the error signal Ie which is applied to the second dynamic compensation stage 32. There the signal is amplified, integrated and filtered in accordance with a function having the LaPlace transform $KN/[S(S/199,000+1)]$, wherein, in one preferred embodiment, the gain $K=725$, and $N=0.0000503S+1$. As noted above, the compensating functions of dynamic compensation stages 28 and 32 operate together to prevent erroneous switching due to command signal noise. The compensation provided in dynamic compensation stage 32 is used to control the modulation frequency of the switching.

The rest of the circuit of FIG. 4 comprises the level dependent logic stage 34, coupled to receive the compensated error signal Ie from stage 32 and provide signals to a following commutation logic stage 38 representing desired on and off states for the switches corresponding to those shown in FIG. 2 (CWP, CWM, CCWM, and CCWP, and their complements). These are combined with phase signals (∅1, ∅2 and ∅3 and the complements thereof for the three phase winding shown in FIG. 5) as developed from the motor 11 by a rotor position sensor stage 36. Circuitry in the commutation logic stage 38 develops control signals for the switching circuit 40 which drive the motor 11 from a power source.

Figure 5:
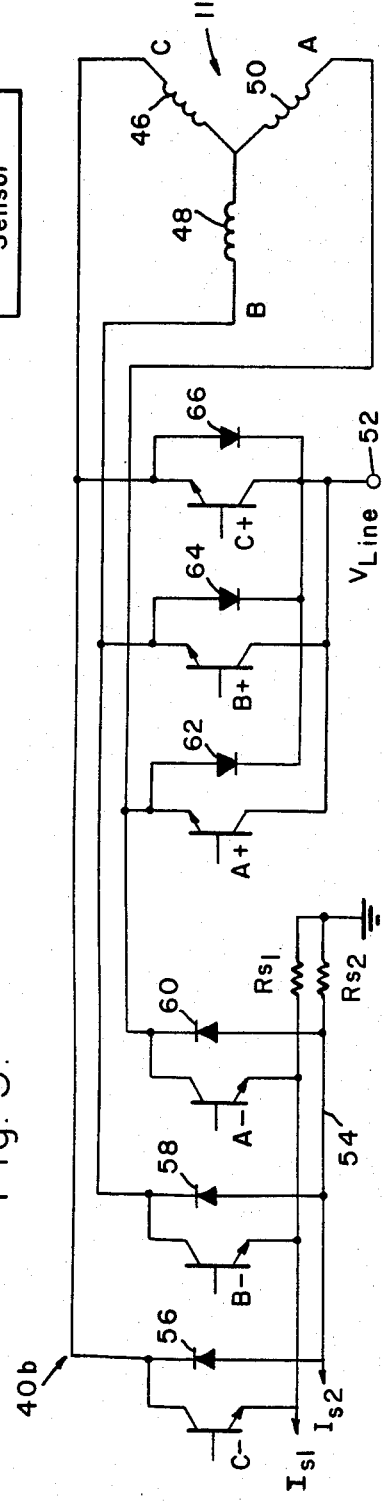
FIG. 5 is a simplified circuit diagram of the motor switching circuit of FIG. 4.

FIG. 5 is an exemplary circuit corresponding to the switching circuit 40 of FIG. 4 wherein the motor 11 is represented schematically as having windings A, B and C (respectively numbered 50, 48 and 46) connected in a wye configuration and coupled to switching transistors A−, B−, C−, A+, B+ and C+. The switching transistors shown in FIG. 5 are merely exemplary of solid state switching devices. It will be understood that the actual circuits corresponding to these individual transistors may comprise conventional power switching circuits as are known in the art. In the circuit of FIG. 5, the negative transistors A−, B− and C− have their emitters coupled together and connected to ground through a series sensing resistor RS1. The positive switching transistors A+, B+, and C+ have their collectors coupled together and connected to a positive line voltage terminal 52. The free end of each motor winding is coupled between the two transistors of a pair. Thus, for example, the pair of transistors A− and A+ which are connected to the A winding 50 have the capability of connecting the winding 50 either to ground or to positive VL terminal 52. The same is true for the remaining transistor pairs and the corresponding motor windings 48 and 46.

Each of the switching transistors of FIG. 5 has an associated diode 56, 58, 60, 62, 64 or 66, connected in parallel with it, but with a polarity such as to permit current flow in the opposite direction to that through the associated transistor. Diodes 56, 58 and 60 are coupled together and connected to ground through a diode current sensing resistor RS2.

By comparison with the circuit of FIG. 2, the similarities between the switching transistors of FIG. 5 and the switching transistors of FIG. 2 can be discerned, except that the circuit of FIG. 2 is for a single phase motor, whereas the circuit of FIG. 5 is for a three phase motor. As indicated in FIG. 2, the transistor current sensing and diode current sensing signals IS1 and IS2 are picked off the sensing resistors RS1 and RS2 for application in the current sensor stage 41 (FIG. 4).

Figure 6A:
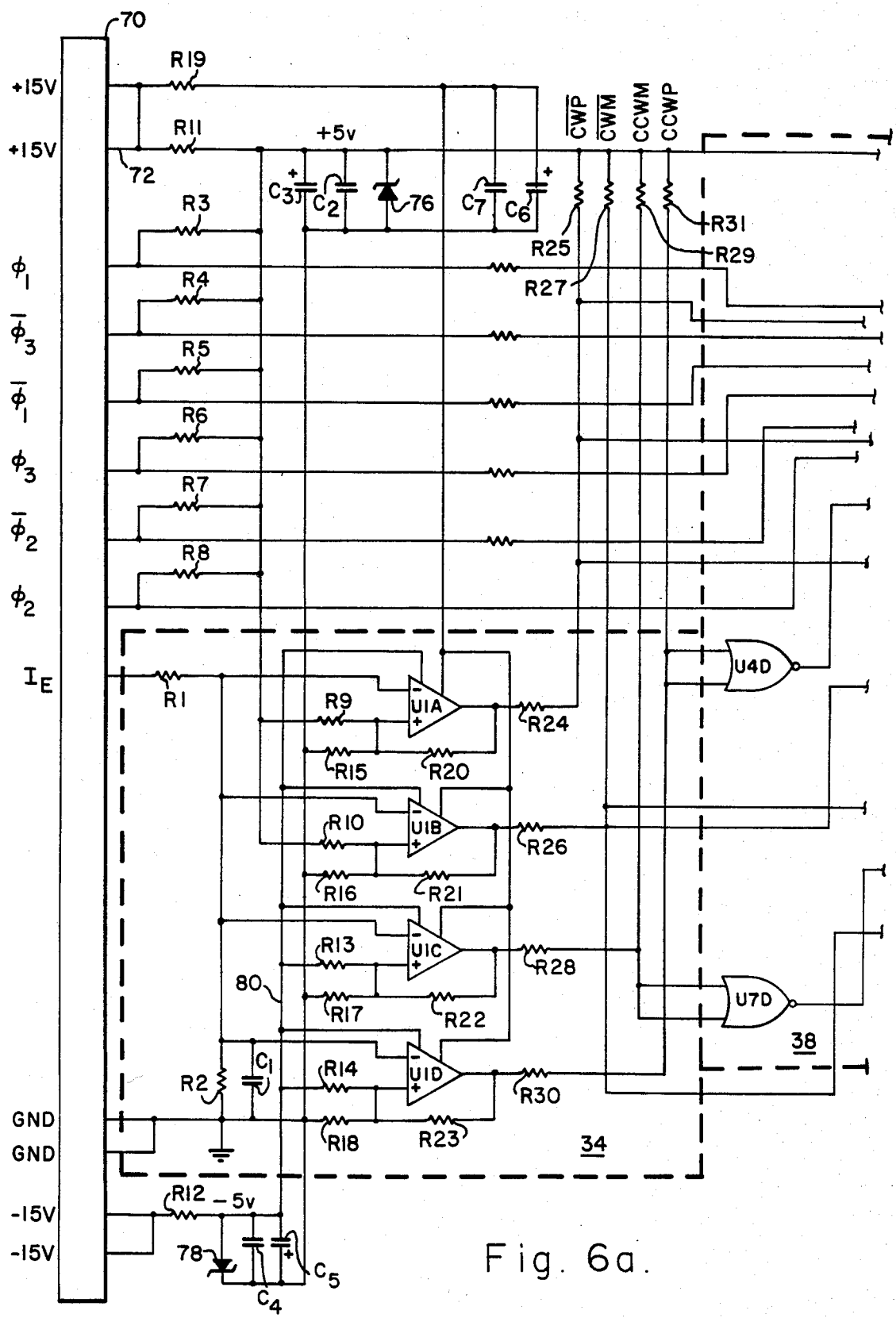
FIG. 6, comprising parts 6a and 6b, is a schematic diagram representing portions of the control circuitry of FIG. 4.

FIG. 6 is a schematic diagram illustrating particular details of the circuitry employed in the level dependent logic stage 34 and the commutation logic stage 38 for driving the switching circuit 40 (see FIGS. 4 and 5). As shown in FIG. 6a, the integrated error signal Ie is dropped across a voltage divider comprising resistors R1 and R2 and filter capacitor C1 and applied to one input of each of four level dependent switches U1A, U1B, U1C and U1D. These are connected across positive and negative power supplies as shown, and furthermore the two switches U1A and U1B have second input terminals coupled through resistors R9 and R10 to the +5 volt supply while the switches U1C and U1D have their second input terminals coupled through resistors R13 and R14 to the −5 volt supply. The different connections and the different values of the input coupling resistors develop different bias levels for the switches U1A–U1D so that the switches change state for different levels of applied error signal Ie, applied at the terminal block 70. Phase signals from the rotor position sensor 36 (FIG. 4) are also applied at the terminal block 70 and fed directly through to the commutation logic stage 38. These lines are connected respectively to the +5 volt power supply through resistors R3–R8. Plus 15 volts, −15 volts, and ground connections are provided to establish the +5 volt and −5 volt power supplies. The +5 volt power supply comprises a Zener diode 76 and filter capacitors C2 and C3, connected to the +15 volt line 72 through series resistor R11. The plus voltage for the switches U1A–U1D is taken from another 15 volt line through series resistor R19, filtered by capacitors C6 and C7.

The −5 volt supply is developed from −15 volts supplied through series resistor R12 and the Zener diode 78 and parallel capacitors C4 and C5. Each of the switches U1A–U1D is provided with resistors R15–R18 and R20–R23, respectively, connected as shown, plus output coupling resistors R24, R26, R28 and R30, respectively. These switch output lines are further connected to the +5 volt line through respective resistors R25, R27, R29 and R31. As noted in FIG. 6a immediately above these resistors, these output lines correspond respectively to the switching signals representing CWP complement, CWM complement, CCWM and CCWP. These output signals from the level dependent switches in level dependent logic stage 34 are applied to comparators in the commutation logic stage 38 for combination with the respective phase signals $\phi1$, $\phi2$, $\phi3$ and their respective complements which are combined in the manner indicated in the circuit of the commutation logic stage 38 by means of the NOR gates U2A–C, U3A–C, U4A–D, U5A–C, U6A–C, and U7A–D as shown. The six outputs of the commutation logic stage 38 are indicated as the complements of signals A+, B+, C+, A−, B− and C− which correspond to the following commutation equations by virtue of the operation of the commutation logic on the variables indicated:

| COMMUTATION EQUATIONS |
| --- |
| A+ = $\overline{\phi1}\,\overline{\phi3}$ CWP + $\phi1\,\overline{\phi3}$ CCWP |
| B+ = $\phi2\,\overline{\phi3}$ CWP + $\overline{\phi2}\,\phi3$ CCWP |
| C+ = $\phi1\,\overline{\phi2}$ CWP + $\overline{\phi1}\,\phi2$ CCWP |
| A− = $\phi1\,\overline{\phi3}$ CWM + $\overline{\phi1}\,\phi3$ CCWM |
| B− = $\overline{\phi2}\,\phi3$ CWM + $\phi2\,\overline{\phi3}$ CCWM |
| C− = $\overline{\phi1}\,\phi2$ CWM + $\phi1\,\overline{\phi2}$ CCWM |

The development of the commutation equations in the circuitry of FIG. 6 may be considered by an example with respect to the upper line involving the NOR gates U2A, U2B and U4A. The inputs to NOR gate U2A are $\phi1$ and the complements of CWP and $\phi3$. The output of NOR gate U2A, applied as one of the inputs to NOR gate U4A, will thus be true (or representing the value 1) only when all three of the inputs are false (or 0). This is equivalent to $\phi1\overline{\phi3}$CWP.

Similarly, the inputs to NOR gate U2B are $\phi3$ and the complements of $\phi1$ and CCWP, the latter being developed by inversion through the NOR gate U4D. The output of NOR gate U2B, applied as the other input to NOR gate U4A, is $\overline{\phi1}\phi3$CCWP. The output of NOR gate U4A thus becomes the complement of the commutation equation for A+, which becomes inverted in the transistor stage 84 to develop the A+ signal as expressed in the commutation equations.

Figure 6B:
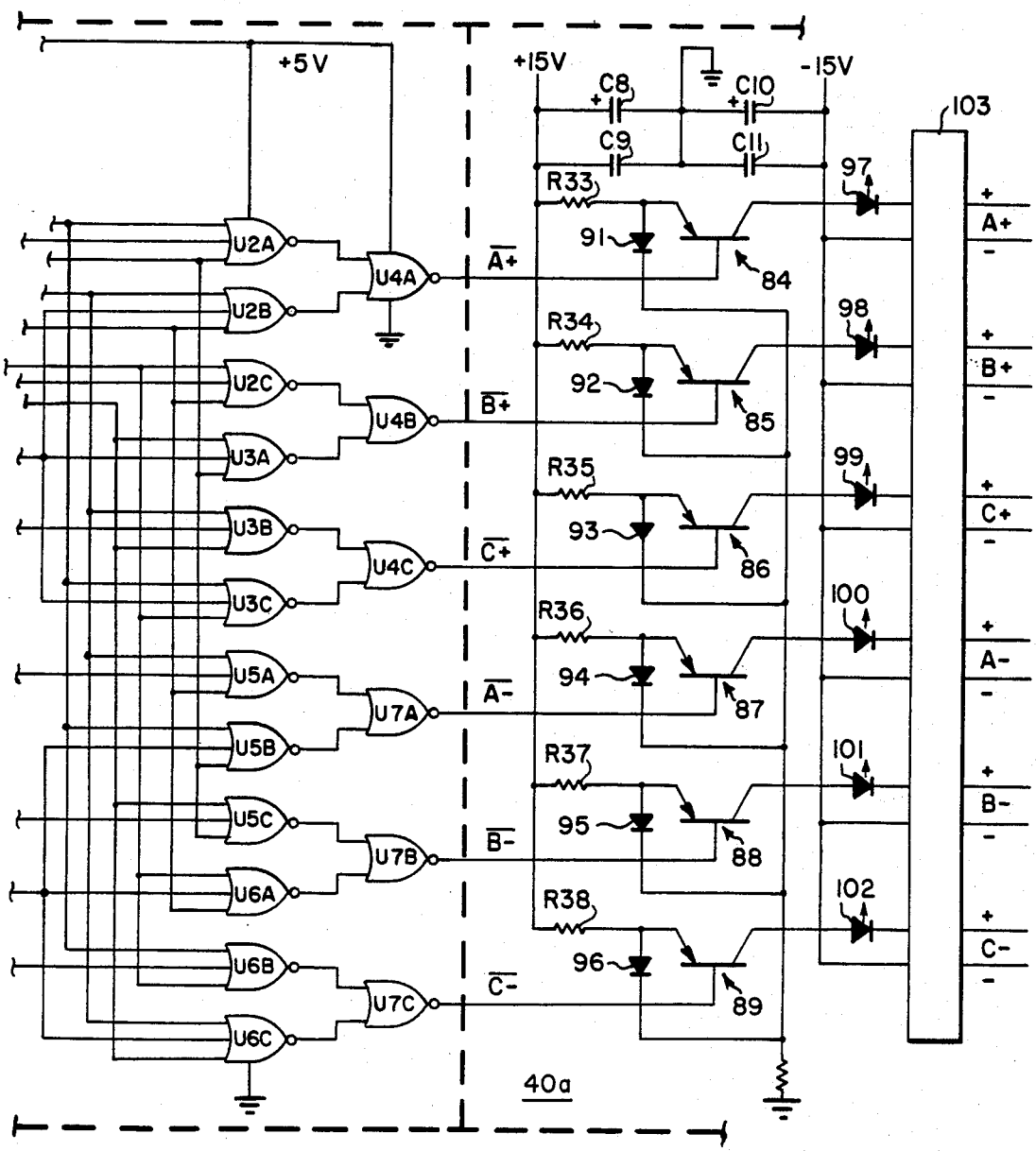

The remaining portion of FIG. 6, located within the broken lines to the right of the figure and designated 40A, represents a driving stage to the power switching transistors of the switching transistors designated 40B in FIG. 5. As shown in FIG. 6b the driving transistors are designated by numbers 84–89, having respective resistors R33–R38 connected to the +15 volt side of a power supply which is center tapped to ground and has filter capacitors C8 and C9 coupled to +15 volts and capacitors C10 and C11 coupled to −15 volts. −15 volts is fed out through the terminal block 103 as the minus side of the respective drive line pairs carrying the signals corresponding to the commutation equations. It will be understood that, although the transistor switches of FIG. 5 are shown as single transistors for simplicity and ease of understanding, these transistors are in fact, as indicated above, more complex power switching circuits to which dual drive lines are connected for control. The other one of each pair of the output control lines from the terminal block 103 in FIG. 6 is coupled to the output terminal (collector) of a corresponding one of the inverting driver transistors 84–89. In series with each such output line is a corresponding one of a plurality of light emitting diodes (LEDs) 97–102 which are included in the circuit for test purposes.

Another switching stage, similar to the stages U1A–U1D but not shown in the circuitry of FIG. 6, is included in the level dependent logic stage 34 of the circuit of FIG. 4. This switching circuit is biased to change state about the zero level of applied control voltage. This provides the NORMAL output and its complement (+1/−1) which is applied as the multiplier for the feedback current in the stage 42 so that the feedback current can be made negative when counterclockwise operation is desired. The relationship of the NORMAL switch relative to the remaining switches in the level dependent logic is indicated in FIG. 7. The changes of state of the NORMAL switch occur as the applied error signal changes polarity and as the control circuitry is progressing from counterclockwise operation to clockwise operation (considering the applied control voltage progressing in the positive direction). With the exception of the addition of the NORMAL switch states shown in FIG. 7, FIG. 7 corresponds to FIG. 1 and the explanation is comparable thereto.

In accordance with an aspect of the present invention, the level dependent logic, as just described, allows for the proper switching transistors to be turned on without having to have prior knowledge as to which transistors are needed because of variations in the operating modes. As described above, the current sensor 41 receives the feedback current signals IS1 and IS2 developed across the sensing resistors as shown in FIG. 5 and provides an output signal corresponding to the larger of the two. Since the currents through RS1 and RS2 only give the absolute value of the current flow in the motor, the resultant current feedback signal must be inverted if the motor is being driven in the counterclockwise direction. The current feedback is inverted in the stage 42 (FIG. 4) depending on which transistor switches are being turned on next. The feedback sign may not agree with the current in the actual motor winding, but this is in accordance with the four-quadrant control realized by the control circuit of the present invention.

The "highest wins" stage for comparing the absolute value signals developed across RS1 and RS2 of FIG. 5 may be eliminated and a simple summing stage may be used if the circuit modification shown in FIG. 8 is employed. FIG. 8 represents a portion of the circuit of FIG. 5 showing the diodes 62, 64 and 66 coupled in association with switching transistors A+, B+ and C+, similar to the arrangement in FIG. 5 except that the common connection to the cathodes of the diodes 62, 64, 66 is connected in series with a resistor RS2′ to the +VL terminal 52. With the switching circuit connected as shown in FIG. 8, the resistor RS2 of FIG. 5 would be eliminated, and the diode feedback signal IS2 is derived from the resistor RS2′. With this circuit, a simple summing stage can be provided for comparing IS1 and IS2. The method of driving the motor is independent of the method of making the current measurement for the feedback signal.

The use of control circuits in accordance with the present invention as shown and described hereinabove for controlling the power applied to an actuator motor is particularly advantageous in electrical actuating systems for controlling the control surfaces and certain other elements which are now controlled by hydraulic systems in aircraft. Indeed, control systems in accordance with the invention may be used in many applications where reliable operation, simplification of hardware and reduction of weight are desired. It will be understood that for fail-safe reliability, as in an aircraft control system or the like, dual channel redundancy is provided by duplicating the actuator motors, control circuits, and the like.

Although there have been described above specific arrangements of a multi-quadrant brushless DC motor drive in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for controlling the current and torque of a brushless DC motor comprising:
   a brushless DC motor having a plurality of windings;
   a plurality of solid state power switches respectively connected to said windings for selectively applying power to develop current therein;
   means for determining the states and order of switching between states of said solid state switches in response to a current error signal;
   means for deriving a current feedback signal indicative of current in the motor windings; and
   means for combining the current feedback signal with an applied current command signal to develop the error signal.

2. The apparatus of claim 1 wherein the motor has at least three windings and further including rotor position sensing means for providing phase signals for application to said determining means.

3. The apparatus of claim 2 wherein the determining means comprises a plurality of level dependent switches coupled to be controlled by said current error signal, each of said switches being switchable between on and off states and exhibiting a hysteresis effect relative to the directions of change of state in response to the control voltage thereof.

4. The apparatus of claim 3 wherein each of said level dependent switches is biased to change state at a different control voltage level than the other switches.

5. The apparatus of claim 4 wherein the level dependent switches are arranged by pairs, one pair being for controlling motor drive in one direction of rotation, the other pair being for controlling motor drive in an opposite direction of rotation.

6. The apparatus of claim 5 wherein the switches for controlling motor drive in a first direction are biased to change state at negative discrete levels of control voltage while the pair of switches for controlling motor drive in the opposite direction of rotation are biased to change state for positive discrete levels of control voltage.

7. The apparatus of claim 6 further including a single level dependent switch biased to change state in the vicinity of zero control voltage to develop a signal for affecting the sign of the feedback current signal.

8. The apparatus of claim 3 or claim 6 wherein the determining means further includes a plurality of commutation logic means for combining signals from the respective pairs of level dependent switches and the rotor position sensing means to coordinate level dependent switch output signals with the phase signals.

9. The apparatus of claim 8 wherein the commutation logic means comprise a plurality of interconnected gates coupled to receive respective inputs from the level dependent switches and the rotor position sensing means for developing control signals to control the power switches in accordance with a predetermined set of commutation equations.

10. The apparatus of claim 9 wherein said power switches are arranged by pairs, one pair for each motor winding, and are operable to selectively apply positive and negative voltage to the corresponding windings.

11. The apparatus of claim 10 wherein said power switches correspond to the designations A+, A−, B+, B−, C+ and C−, depending on their connections to corresponding windings and to positive and negative sides of the power supply, and wherein the selected commutation equations correspond to the following:

| |
| --- |
| $A+ = \overline{\phi 1}\, \phi 3\, CWP + \phi 1\, \overline{\phi 3}\, CCWP$ |
| $B+ = \phi 2\, \overline{\phi 3}\, CWP + \overline{\phi 2}\, \phi 3\, CCWP$ |
| $C+ = \phi 1\, \overline{\phi 2}\, CWP + \overline{\phi 1}\, \phi 2\, CCWP$ |
| $A- = \phi 1\, \overline{\phi 3}\, CWM + \overline{\phi 1}\, \phi 3\, CCWM$ |
| $B- = \overline{\phi 2}\, \phi 3\, CWM + \phi 2\, \overline{\phi 3}\, CCWM$ |
| $C- = \overline{\phi 1}\, \phi 2\, CWM + \phi 1\, \overline{\phi 2}\, CCWM$ |

12. The apparatus of claim 1 wherein each of the power switches has a diode connected in parallel with it and poled to conduct current in a direction opposite to the normal direction of current through the associated switch.

13. The apparatus of claim 12 further including means for sensing the magnitude of current in the motor windings.

14. The apparatus of claim 13 wherein said current sensing means comprises a first resistor connected in series with the power switches coupled between the windings and one side of the power supply and a second resistor connected in series between said one side of the power supply and the diodes associated with said switches.

15. The apparatus of claim 14 further including means for comparing voltages developed across said first and said second resistors to develop a current feedback signal.

16. The apparatus of claim 15 further including means for controlling the sign of said current feedback signal in accordance with the commanded direction of rotation of the motor.

17. The apparatus of claim 16 further including filter means connected in the feedback current loop, said filter means being selected to exhibit a band limiting characteristic having an upper roll-off frequency of approximately 314,00 radians per second.

18. The apparatus of claim 16 further including a single level dependent switch biased to change state when the control voltage applied thereto changes polarity.

19. The apparatus of claim 18 further including means for multiplying the derived current feedback signal with an output signal from said single level dependent logic switch in order to control the sign of the feedback current signal in accordance with the level of the error signal applied to the level dependent switches.

20. The apparatus of claim 17 further including a dynamic compensation means coupled between said signal combining means and the level dependent logic means for integrating and filtering the current error signal to develop the control signal for the level dependent logic means.

21. The apparatus of claim 20 wherein said dynamic compensation means includes filtering means for limiting the bandwith to an upper limit having a roll-off frequency of approximately 199,000 radians per second.

22. The apparatus of claim 21 wherein said dynamic compensation means further includes amplifying means having a selected gain which, together with the hysteresis characteristic of the level dependent switches, is effective to develop pulse width modulation control of the power switches.

23. The apparatus of claim 20 further including additional dynamic compensation means for processing a current command signal prior to combination thereof with the current feedback signal, said additional dynamic compensation means including a current limiting stage for limiting the command signal within a selected range corresponding to the range of permissible current levels in the motor windings.

24. The apparatus of claim 23 wherein the additional dynamic compensation means includes a band limiting filter having an upper roll-off frequency of approximately 15,000 radians per second.

25. The apparatus of claim 23 further including means for receiving a position command signal and converting said signal to a corresponding current command signal for application to said additional dynamic compensation means.

26. The apparatus of claim 25 comprising an actuator connected to be driven by the motor and a feedback loop including an actuator position sensor for providing a position feedback signal to be compared with said position command signal in developing a position error signal.

27. The apparatus of claim 26 further including a rate feedback loop coupled to develop a rate feedback signal indicative of motor speed and means for comparing the position error signal and the rate feedback signal to develop the current command signal.

28. The apparatus of claim 12 wherein said current sensing means comprises first means for sensing the current in the power switches connected to one side of the power supply and second sensing means for sensing the current in the diodes associated with switches connected to the other side of the power supply, and means for summing said two current signals.

29. A method of controlling the current and torque of a brushless DC motor in response to a current command signal, which motor has a plurality of windings and associated power switches for applying power to the windings, comprising the steps of:
applying a current error signal to a plurality of level d ependent switches to selectively control the conduction states thereof, each of said switches being biased to develop a change of conduction state at a unique level of control voltage;
applying signals developed from the outputs of the level dependent switches to control the states of the power switches;
deriving a current feedback signal indicative of motor current; and
combining the current feedback signal with an applied current command signal to develop the error signal.

30. The method of claim 29 wherein the motor has at least three windings, further including the step of combining the output signals of the level dependent switches with signals indicative of motor phase in accordance with a predetermined commutation logic arrangement, and applying the resulting signals to the power switches.

31. The method of claim 29 wherein the combining step comprises applying the output signals from the level dependent switches to a selectively intercoupled plurality of NOR gates to develop a plurality of commutation equations to determine the actuation of the power switches.

32. The method of claim 30 wherein the commutation equations correspond to the following:

$$A+ = \overline{\emptyset 1}\ \emptyset 3\ CWP + \emptyset 1\ \overline{\emptyset 3}\ CCWP$$

$$B+ = \emptyset 2\ \overline{\emptyset 3}\ CWP + \overline{\emptyset 2}\ \emptyset 3\ CCWP$$

$$C+ = \emptyset 1\ \overline{\emptyset 2}\ CWP + \overline{\emptyset 1}\ \emptyset 2\ CCWP$$

$$A- = \emptyset 1\ \overline{\emptyset 3}\ CWM + \overline{\emptyset 1}\ \emptyset 3\ CCWM$$

$$B- = \overline{\emptyset 2}\ \emptyset 3\ CWM + \emptyset 2\ \overline{\emptyset 3}\ CCWM$$

$$C- = \overline{\emptyset 1}\ \emptyset 2\ CWM + \emptyset 1\ \overline{\emptyset 2}\ CCWM$$

wherein A+, B+, C+, A−, B− and C− designate specific power switches; $\emptyset 1$, $\emptyset 2$ and $\emptyset 3$ designate specific phase signals corresponding to rotor position; and CWP, CWM, CCWP and CCWM designate signals from the level dependent switches.

33. The method of claim 29 wherein the step of deriving a current feedback signal comprises sensing the current in the power switches and the current in shunt current paths individually associated therewith, and combining said two currents to develop a signal corresponding to the higher absolute value of said currents 34. The method of claim 33 wherein the step of deriving the current feedback signal further includes establishing the sign of said absolute value signal in accordance with a signal from a level dependent switch which is biased to change state about the zero level of control voltage.

35. The method of claim 33 further comprising the step of changing the sign of the feedback current signal when it is desired to reverse the direction of acceleration of the motor.

36. The method of claim 29 further including the step of limiting the range of the current command signal in accordance with the limits of permissible current in the motor.

37. The method of claim 29 further including the step of developing the current command signal in response to a position command signal by modifying the position command signal in accordance with position feedback and rate feedback signals derived from the motor.

* * * * *